United States Patent
Jarisch et al.

(10) Patent No.: US 9,980,595 B2
(45) Date of Patent: May 29, 2018

(54) DEVICE FOR PREPARING A BEVERAGE BY CENTRIFUGATION

(75) Inventors: Christian Jarisch, Lutry (CH); Stefan Etter, Kehrsatz (CH); Alexandre Perentes, Lausanne (CH)

(73) Assignee: Nestec S.A., Vevey (CH)

( * ) Notice: Subject to any disclaimer, the term of this patent is extended or adjusted under 35 U.S.C. 154(b) by 167 days.

(21) Appl. No.: 13/810,370

(22) PCT Filed: Jun. 30, 2011

(86) PCT No.: PCT/EP2011/061083
§ 371 (c)(1),
(2), (4) Date: Feb. 26, 2013

(87) PCT Pub. No.: WO2012/007293
PCT Pub. Date: Jan. 19, 2012

(65) Prior Publication Data
US 2013/0206014 A1    Aug. 15, 2013

(30) Foreign Application Priority Data
Jul. 16, 2010    (EP) .................................... 10169803

(51) Int. Cl.
*A47J 31/22*    (2006.01)
*A47J 31/40*    (2006.01)

(52) U.S. Cl.
CPC ............. *A47J 31/22* (2013.01); *A47J 31/407* (2013.01)

(58) Field of Classification Search
CPC ................................. A47J 31/22; A47J 31/407
(Continued)

(56) References Cited

U.S. PATENT DOCUMENTS

| 4,700,621 A | * | 10/1987 | Elger ............................ 99/511 |
| 5,566,605 A | | 10/1996 | Lebrun et al. |

(Continued)

FOREIGN PATENT DOCUMENTS

| DE | 3137688 | * | 4/1983 |
| DE | 3137688 A1 | | 4/1983 |

(Continued)

OTHER PUBLICATIONS

International Search Report and Written Opinion dated Oct. 19, 2011 for Intl. Appln. No. PCT/EP2011/061083.
(Continued)

*Primary Examiner* — David Angwin
*Assistant Examiner* — Frederick Calvetti
(74) *Attorney, Agent, or Firm* — K&L Gates LLP

(57) ABSTRACT

Device for preparing a beverage from a beverage ingredient contained in a receptacle (17) by driving the receptacle in centrifugation comprising: —a holding part (16) arranged for holding the receptacle in a position enabling it to be driven in rotation along a longitudinal axis of rotation (I), —a liquid interfacing part (8) arranged for supplying water in the receptacle and/or extracting the beverage from the receptacle, —a collecting part (44) for collecting the beverage obtained by the interaction between the ingredient and water in the receptacle, wherein the holding part and liquid interfacing part (8, 16) are connected together by connection means in such a manner that these parts (8, 16) rotate together with the receptacle during centrifugation, wherein the connection means comprise at least a first engaging surface (48; 86) of the holding part (16) and a second engaging surface (23; 87) of the liquid interfacing part (8) engaged in contact together during connection in a manner preventing the holding part (16) and the liquid interfacing part (8) from moving away from each other, at least in the
(Continued)

axial direction of rotation (I), and the connection means further comprising at least one mass of inertia (20, 21, 31; 80) arranged to be moveably connected to at least one of the parts (8, 16) with at least one degree of freedom in a least one radial direction for enabling the engagement forces to increase between the two engaging surfaces as a result of the increase of the centrifugal forces.

9 Claims, 6 Drawing Sheets

(58) Field of Classification Search
USPC .......................... 99/302 C, 302 R, 295, 287
See application file for complete search history.

(56) References Cited

U.S. PATENT DOCUMENTS

| | | | |
|---|---|---|---|
| 6,609,455 B2* | 8/2003 | Fouquet | A47J 19/027 |
| | | | 99/511 |
| 8,431,175 B2* | 4/2013 | Yoakim | A47J 31/22 |
| | | | 426/431 |
| 2003/0052206 A1* | 3/2003 | Fouquet | 241/92 |
| 2009/0049998 A1* | 2/2009 | Kim | 99/510 |
| 2010/0239734 A1* | 9/2010 | Yoakim | A47J 31/22 |
| | | | 426/433 |

FOREIGN PATENT DOCUMENTS

| | | |
|---|---|---|
| JP | 09164343 | 6/1997 |
| JP | 2001517144 | 10/2001 |
| WO | 2008/148601 | 12/2008 |
| WO | 2008/148646 A1 | 12/2008 |
| WO | 2008/148650 | 12/2008 |
| WO | WO2008148646 | * 12/2008 |
| WO | 2010026045 | 3/2010 |
| WO | 2010066705 | 6/2010 |

OTHER PUBLICATIONS

Chinese Office Action for Application No. 201180044641.1, dated Dec. 26, 2014, 17 pages.

* cited by examiner

DEVICE FOR PREPARING A BEVERAGE BY CENTRIFUGATION

CROSS REFERENCE TO RELATED APPLICATIONS

The present application is a National Stage of International Application No. PCT/EP2011/061083, filed on Jun. 30, 2011, which claims priority to European Patent Application No. 10169803.3, filed Jul. 16, 2010, the entire contents of which are being incorporated herein by reference.

The present invention relates to the field of the preparation of a beverage by centrifugation. In particular, it relates to a device for preparing a beverage such as coffee by using centrifugation to brew and extract the beverage from a receptacle.

The preparation of a beverage by using centrifugation is known. The principle mainly consists in providing a beverage ingredient in a receptacle, feeding liquid in the receptacle and rotating the receptacle at elevated speed to ensure interaction of the liquid with the powder while creating a gradient of pressure of liquid in the receptacle; such pressure increasing gradually from the centre towards the periphery of the receptacle. As liquid traverses the coffee bed, extraction of the coffee compounds takes place and a liquid extract is obtained that flows out at the periphery of the receptacle.

WO2008/148601 describes a possible example of a device using such principle wherein the receptacle is a sealed capsule which is opened before its use. Hot water is fed in the centre of the capsule via a water interfacing part comprising a water injector aligned in the rotation axis. The receptacle is held in a capsule holder which is rotated by means of a rotary motor. Both the liquid interfacing part and the capsule holding part are mounted along roller bearings. The beverage is extracted from the capsule by a plurality of peripheral needles that creates openings through a lid of the receptacle. As the capsule is centrifuged about its rotation axis, hot water passes through the beverage ingredient, interacts with it to produce a liquid extract and the resulting liquid extract traverses, under the effect of the centrifugal forces, the peripheral openings and is projected against an impact wall of the collector. The liquid extract, thus constituting the beverage, is then drained through a beverage duct of the device and collected into a recipient such as a cup.

WO2008/148646 and WO2008/148650 further describe a beverage preparation device wherein a flow restriction is created downstream of the receptacle, in particular a capsule, for example, by a valve system which opens or enlarges under the pressure created by the centrifuged liquid leaving the receptacle. The valve system can be formed by a mobile restriction part of the device which is elastically urged against a rim portion of the capsule.

U.S. Pat. No. 5,566,605 relates to a centrifugal type extraction cell having a deformable sealing joint for hot beverage preparation machine. The cell comprises a drum and a cover defining with the drum an internal volume. The cover is connected to the drum by attachment ears that engage in ramps.

US2003/0052206A1 relates to a device for driving tool for a food-processing apparatus. The apparatus processes the food placed in it, particularly pressing, cutting, grating or slicing. It relates in particular to a juice extractor for fruit and vegetables or to a citrus-fruit squeezer, a grater or a vegetable-cutting disc. The device comprises a basket connected to a base part. The base part is mounted around a drive head. The connection between the base part and the drive head is obtained by at least two studs of the head which can be moved under the centrifugal forces towards a peripheral reinforcement of the base part. An annular elastic membrane is also provided to return the studs towards their withdrawn position when no centrifugal force is involved. However, this invention simply deals with the rapid connection of a rotary tool, more specifically, a fruit or vegetable extracting basket onto a drive head. In particular, the basket is essentially open and is not engaged by a liquid interfacing part. In particular, there is no pressure of centrifuged liquid (e.g., fruit juice) involved which acts directly or indirectly on the connection of the rotating parts.

U.S. Pat. No. 4,700,621 also relates to a quick/disconnect coupling for high speed appliance such as juice extractor wherein a basket is positively connected for rotation and axially latched to a drive assembly without mechanical adjustment.

In the prior art beverage preparation devices, the water interfacing part which supplies the receptacle with water and the holding part which holds the receptacle are rotatable along frame portions of the device which are secured together by a closure mechanism such as a bayonet system or the like. The holding part is generally mounted on a frame part via at least one roller bearing. The liquid interfacing part is also generally part of a frame part also mounted along at least one roller bearing. When the device is rotated at high speed during centrifugation, the pressure of the liquid extract creates important axial and radial forces on the rotating parts which tend to separate these rotating parts.

A problem of the prior art beverage preparation devices comes from the difficulty to provide a closure of the device about the receptacle that properly resists to axial and radial forces created by the centrifugal pressure of the liquid. The centrifugal pressure of liquid tends to push the liquid interfacing part in opening and is transmitted to the connection of the parts. In order to maintain a sufficient closure of the parts that resists to the centrifugal pressure, usually a complex closure system is required that creates long tolerance chains for accurately holding and engaging on the receptacle. Furthermore, due to the hydrostatic pressure present in the rotating receptacle, the axial forces tend to provide excessive loads on essential support means of the device such as the roller bearings. As a result, the bearings and other load support mechanical pieces of the device can wear prematurely. In order to prevent these problems, the device must be made more robust but this impacts on the cost of the device.

The present invention aims at solving the above-mentioned problems.

For this, the present invention relates to a device according to claim 1. The dependent claims further develop the present invention.

In particular, the invention relates to a device for preparing a beverage from a beverage ingredient contained in a receptacle by driving the receptacle in centrifugation comprising:
  a holding part arranged for holding the receptacle in a position enabling it to be driven in rotation along a longitudinal axis of rotation,
  a liquid interfacing part arranged for engaging against the receptacle and for supplying water in the receptacle and/or extracting the beverage from the receptacle,
  a collecting part for collecting the beverage obtained by the interaction between the ingredient and water in the receptacle,
  wherein the holding part and liquid interfacing part are connected together by connection means in such a manner that these parts rotate together with the receptacle during centrifugation,
wherein the connection means comprise at least a first engaging surface of the holding part and a second engaging surface of the liquid interfacing part engaged in contact together during connection in a manner preventing the holding part and the liquid interfacing part from moving away from each other, at least in the axial direction of rotation, and the connection means further comprising at least one mass of inertia arranged to be moveably connected to at least one of the parts with at least one degree of freedom in a least one radial direction for enabling the engagement forces to increase between the two engaging surfaces as a result of the increase of the centrifugal forces.

Therefore, contrary to the prior devices, the device of the present invention provides a closure connection between the key rotational parts of the device which becomes stronger by the effect of the centrifugal forces. The engagement forces between the parts are increased under the centrifugal forces to overcome the opening forces that tend to force the parts to open under the effect of the centrifuged liquid in the receptacle and, in particular, which acts against the liquid interfacing part.

In particular, the device is arranged such that the receptacle is held between the holding part and the liquid interfacing part. The liquid interfacing part is arranged for engaging against the receptacle when the receptacle is held in the holding part. The liquid interfacing part is thereby submitted to a gradient of liquid pressure in the receptacle. The invention therefore ensures that the connection resists to such pressure and that the liquid interfacing part remains in engagement with the receptacle during the beverage extraction.

According to an aspect of the invention, the at least one mass of inertia is moveably linked in sliding or rotational arrangement with one of the liquid interfacing part or holding part. For example, the mass of inertia can be part or all of a latching pin or a hook member. Such latching pin or hook member of one part engages into at least one recess portion of the other part.

The engaging surfaces of the two parts of the device are such that they extend at least in a direction of the parts which is inclined or curved relative to the axial direction of rotation. As a result, the centrifugal forces generate a component of forces in the axial direction which applies on the engaging surfaces to increase the connection between the parts during the centrifugal operations.

Preferably, the first engaging surface is part of, respectively, at least one protruding member and the second engaging surface is part of at least one recess member to form together a mutual latching engagement of the connection means or, vice versa, the first engaging surface is part of at least one recess member and the second engaging surface is part of at least one protruding member to form together a mutual latching engagement of the connection means.

The protruding member may be formed of a plurality of elastically biased pins which extends in different radial directions and engages with at least one recess of the other part. Preferably, the elastically biased pins penetrate, in locking engagement, into a circumferential groove of the capsule holding part.

In general, the pins are guided into housings provided in the liquid interfacing part. A spring biasing means such as an helical spring can be lodged in the recess between an abutment surface of each housing and the pin. Such arrangement constitutes in combination with the recess of the other part, a latch.

In general, each elastically biased pin may form, may support or may be linked to the mass of inertia. In a preferred mode, the protruding member, e.g., pin, constitutes by itself the mass of inertia. For this, the pin is made of a high density material such as metal. For instance, the pin is made of steel, copper, brass, lead and so on.

In another alternative, the mass of inertia can be a separate element that cooperates in engagement with the protruding member. It may also be an element which is linked to the protruding member via a mechanical linkage. In general, the liquid interfacing part may comprise means for injecting liquid in the centre of the receptacle. In particular, the liquid injecting means can be formed by a hollow needle that perforates a lid of the receptacle or penetrates through an inlet formed in the lid of the receptacle. The liquid injecting means may also be a nozzle that fits around an inlet of the receptacle.

The liquid interfacing part may also comprise means for extracting the beverage from the receptacle. The beverage extracting means may comprise a series of perforating members for perforating outlet openings in an upper wall of the receptacle. The perforating members can be small conical or pyramidal members distributed along a circular pattern of the liquid interfacing part. These members may provide perforations through a lid of the receptacle. The lid may be a gastight membrane, a porous membrane, a web, a filter paper or combinations thereof. Possibly, a part of the thickness of the lid may resist to the perforation by the members.

For controlling the centrifugal pressure created of the liquid extract in the receptacle, the device comprises a flow restriction valve comprising a pressing portion engaging with a rim portion of the receptacle. Such valve means and its function are, for example, described in WO2008/148646. The function of the valve is essentially to provide a back-pressure which enables to control the residence time of liquid in the receptacle and to control the flow rate of the centrifuged liquid leaving the receptacle.

The pressing portion of the device preferably engages with a rim portion of the receptacle under the load of an elastic biasing means, wherein during centrifugation, the pressing portion of the liquid interfacing part is moved away from the rim portion of the receptacle by the pressure created by the centrifuged beverage on the valve, when a sufficient rotational speed has been reached, so as to create at least one flow passage between the pressing portion and the rim portion of the receptacle. The receptacle may be selected amongst ones having a rim portion of particular thickness so that the valve is determined by the pre-constraint that is set by the selected thickness of the rim portion when engaged against the pressing portion. Typically, the greater the thickness, the greater the pre-constraint on the valve means and the greater the rotational speed is necessary for a given flow rate. The principle of such valve control is further described in co-pending European patent application No. 09178400.9 entitled: "system of capsules for preparing a beverage by centrifugation". As an advantage of the present invention, the flow of the beverage controlled through the flow restriction valve can be more reliably controlled.

In a possible mode, the connection means are located above the receptacle. In such mode, the holding part may comprise radial through-openings positioned substantially at the same level as the rim portion of the receptacle for allowing the centrifuged liquid to traverse the holding part before it impacts on a wall of the collecting part surrounding the holding part.

Moreover, the device may comprise a self-alignment arrangement arranged with one of the holding or liquid interfacing parts; such arrangement comprising elastic means between a bearing of the rotating axle of the part and a frame. This self-alignment arrangement corrects by elasticity the misalignment between the rotary parts at the closure. This also participates to the flexibility and efficiency of the device of the closure in synergy with the other connection means.

The device further comprises a closure actuation mechanism to operate the engagement of the connection between the liquid interfacing part and the holding part in guiding and moving at least one of the said parts relative to the other from an opening position in which the parts are sufficiently distant one another to allow the receptacle to be placed in the holding part to a closure position in which the engagement of the connection means is possible. The closure actuation means are also arranged to carry out the opening of the part for enabling the receptacle to be removed from the device. Such closure actuation mechanism can be a cam system, a rotary bayonet-like closure system or a knee-joint means or an hydraulic means or a motorized spindle-type mechanism or a combination of these systems.

The receptacle is preferably a capsule containing a dose of a beverage ingredient. The capsule may comprise a cup-shaped body comprising a widening sidewall, a rim portion protruding outwardly and a lid covering said body. The rim portion is designed to be inserted between the capsule holding part and liquid interfacing part. In particular, the rim portion is engaged by a pressing portion of the restriction valve of the liquid interfacing part, on one side, and is held on the holding part, on the other side.

The term "capsule" refers to any flexible, rigid or semi-rigid container containing a beverage ingredient. The capsule is separable from the device of the invention and is typically discarded after its use in the device (e.g., recycled, composted or incinerated). Other synonymous to a capsule are: "pod", "pad", "cartridge" or "sachet". The capsule can be single use. The receptacle can also be filled with ingredient by the user to prepare a capsule just before use.

The beverage ingredient can be any suitable food or beverage ingredient that provides a beverage or liquid food when interacting with a liquid, in particular, hot water. In particular, the beverage ingredient is chosen amongst the group consisting of: roast and ground coffee, soluble coffee, green coffee, leaf tea, soluble tea, herbal tea, chicories, cocoa, milk, soup powder, infant formula and combinations thereof. Preferably, the beverage ingredient is essentially roast and ground coffee powder.

The reference to axial and radial directions is generally made in the present description in relation to the longitudinal axis of rotation of the rotating parts or receptacle. An axial direction refers to a direction aligned or parallel to such axis. A radial direction refers to any possible direction which is perpendicular to said axis.

Additional features, advantages and objects of the present invention will become apparent in light of the following detailed description of the preferred embodiments, when taken in conjunction with the figures of the enclosed drawings.

Figure 1:
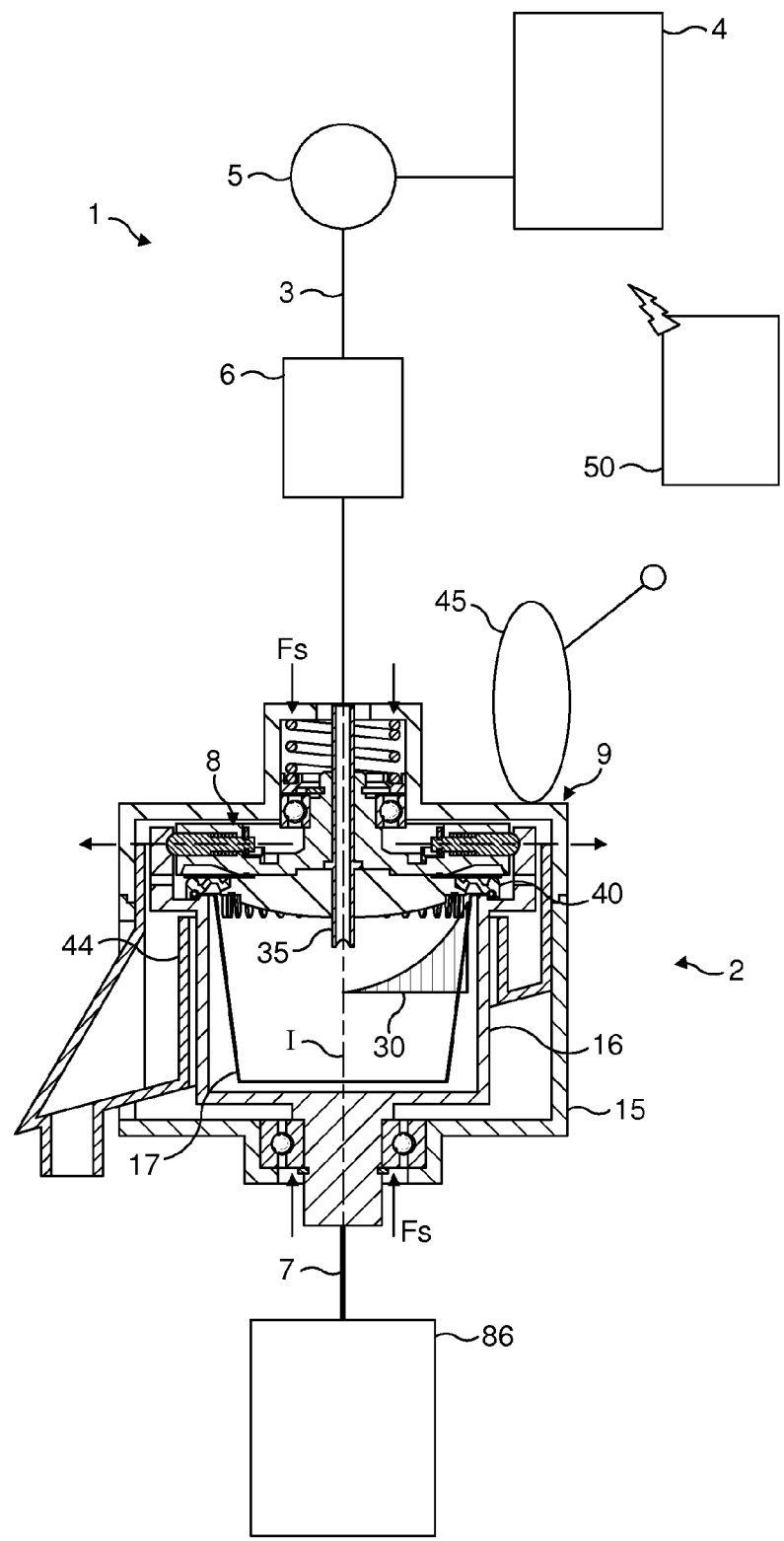
FIG. 1 represents a device of the present invention in closed state of the brewing unit.

A first embodiment is now described in relation to FIGS. 1 to 4 as a matter of example.

The device 1 of the invention generally comprises as known 'per se' a centrifugal brewing unit 2 for receiving and centrifuging a receptacle such as a removable capsule 17 that will be described in greater detail later on. The centrifugal brewing unit is designed for preparing a beverage such as coffee, from both a beverage ingredient contained in the receptacle and water injected in the receptacle. The injected water thoroughly interacts (such as by mixing) with the beverage ingredient and, by virtue of the centrifugal forces, a beverage extract is obtained which is forced to leave the receptacle at its periphery. The unit 2 is placed in liquid communication with a liquid supply line 3 intended for supplying a heated liquid, preferably water, from a reservoir 4 to the unit 2. The liquid is circulated through the line 3 by a pump 5. The pump 5 can be of any suitable type such as a piston pump, a diaphragm pump or a peristaltic pump, for example. A heater 6 is provided along the liquid supply line to heat the liquid at a temperature above ambient temperature. The temperature may vary depending on the beverage to be extracted. For instance, for coffee, water can be heated between about 70 and 100 degrees Celsius.

The brewing unit 2 comprises two rotating parts connected together, in particular, a liquid interfacing part 8 and a lower holding part 16. The two parts are designed for holding a receptacle, such as a capsule containing a beverage ingredient. The device further comprises a rotational driving means such as a rotary motor 86 which is coupled to one of the rotating parts of the brewing module such as the holding part 16 via a coupling means 7 (not mechanically detailed here for a simplification purpose). The rotating parts are arranged in closure along a longitudinal axis of rotation "I". It should be noted that the axis of rotation "I" is not necessarily vertical but can be inclined a certain angle relative to vertical. A control unit 50 is also provided to control the brewing operation, in particular, the rotational speed of the motor 86, the temperature of the liquid provided by the heater and other operations such as the flow rate and amount of liquid supplied by the pump.

Figure 2:
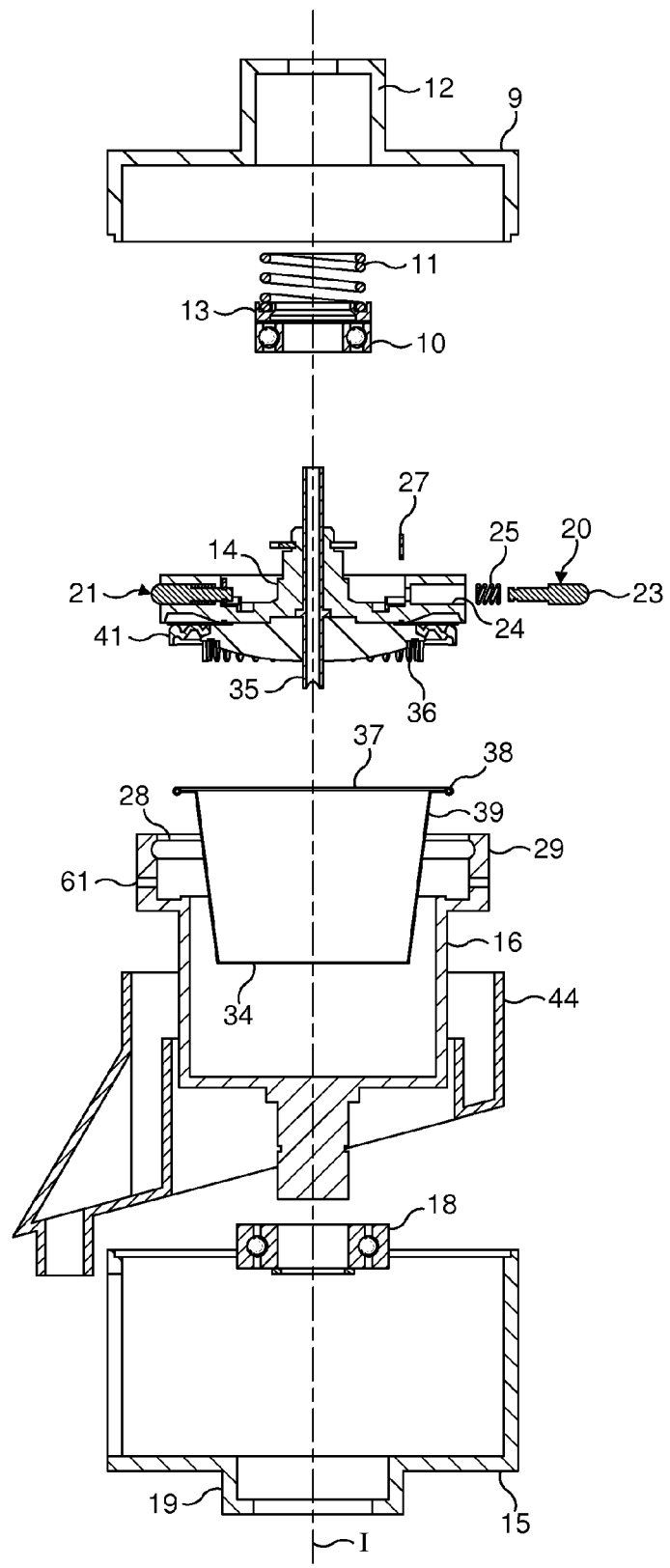
FIG. 2 represents an exploded partial view of the device with the receptacle contained therein of FIG. 1.

As more particularly visible on FIG. 2, the liquid interfacing part 8 is supported in an upper frame 9 via a roller bearing assembly and the lower holding part 16 is also supported by a roller bearing assembly. The liquid interfacing part 8 is mounted in the upper frame 9 through a roller bearing 10 and under the force of an elastic biasing means 11 inserted between the frame and the bearing. The frame 9 comprises an inner housing 12 of reduced cross-section, which receives a helical spring 11 constituting the elastic biasing means. The spring 11 presses on a ring 13 placed adjacent the bearing 10. The spring 11 acts to compensate for the plays and tolerances during closing of the device in the axial direction. The liquid interfacing part 8 furthermore comprises a base plate 14 comprising a central portion designed for engaging through the internal side of the roller bearing 10 while the external side of the bearing fits into the inner housing 12. On the lower side of the brewing unit is disposed the lower frame 15 for receiving a holding part 16 which is intended to support the capsule 17. The holding part 16 is rotationally mounted through the lower frame 15 by means of a lower roller bearing 18 that fits into a lower housing 19 of reduced cross section of the lower frame.

The capsule 17 containing a beverage ingredient is arranged between the two rotating parts 8, 16. The capsule is designed and dimensioned for being held by the holding part 16 and being engaged from above by the liquid interfacing part 8. The capsule comprises a body having a bottom 34, a widening side wall 39 which extends outwardly by a rim portion 38. An upper wall 37 such as a lid covers the body. The lid can be a gastight membrane and/or a porous wall.

The liquid interfacing part 8 comprises an injector 35 designed for injecting liquid in the capsule 17. The injector can be formed of a tube traversing the base plate 14 and ending by a perforating tip. On its upper end, the injector is in liquid communication with the liquid supply line 3. Additional liquid control means such as a check valve may be provided before the tip. At the periphery of the lower surface of the liquid interfacing part is located a series of beverage extracting means 36 designed to perforate the upper wall 37 of the capsule in multiples zones to provide multiple beverage outlets. The peripheral outlets are thus created in the upper wall 37 close to the rim 38 of the capsule where the centrifugal forces are the highest. Alternatively, it could be envisaged to provide outlets on the side wall 39 of the capsule or both on the upper wall 37 and side wall 39 of the capsule. The outlets could also be pre-made in the capsule before insertion of the capsule in the device. It could also be that the rim is formed as a plurality of outlets for the centrifuged liquid.

Figure 3:
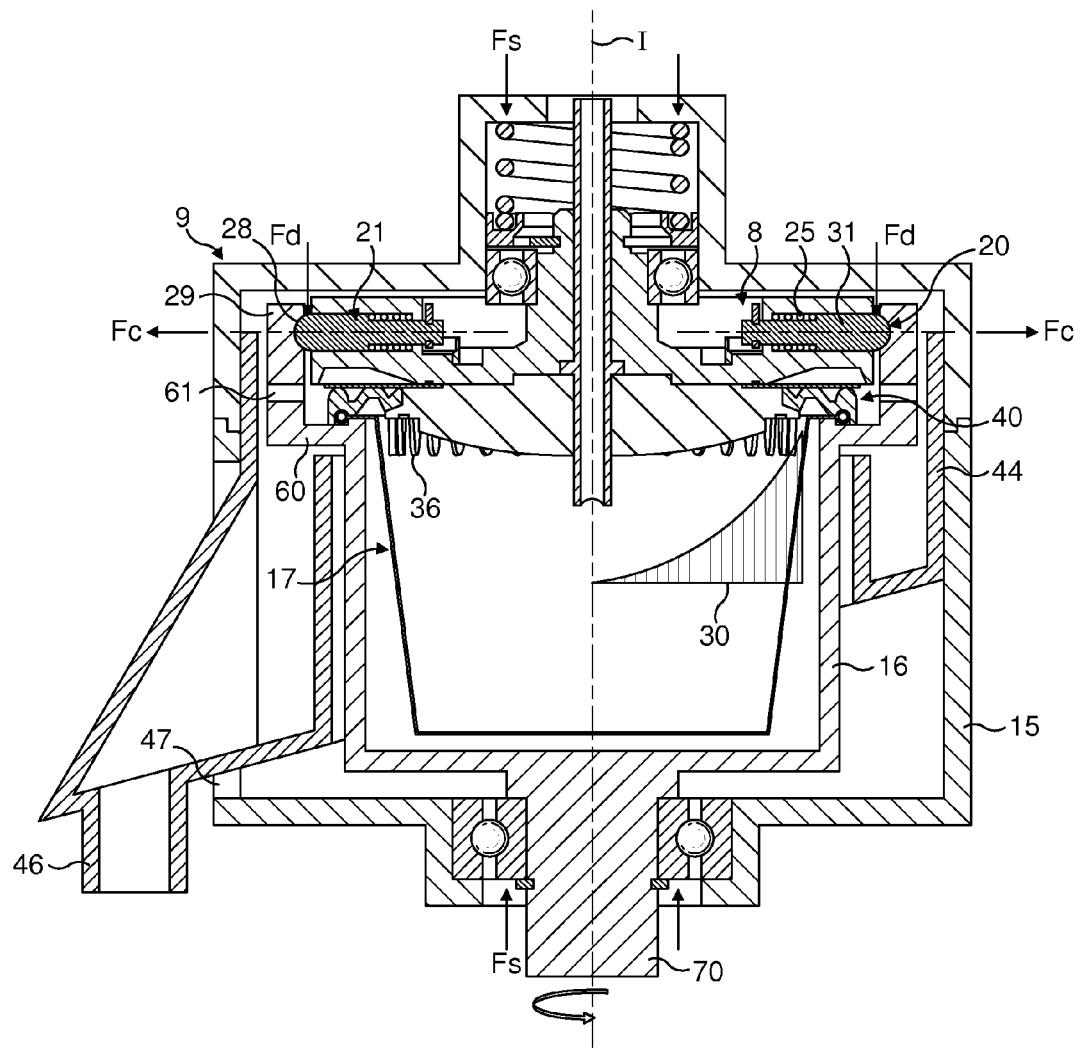
FIG. 3 represents a cross-sectional partial view of the device when closed about a receptacle of the device of the invention.
Figure 3A:
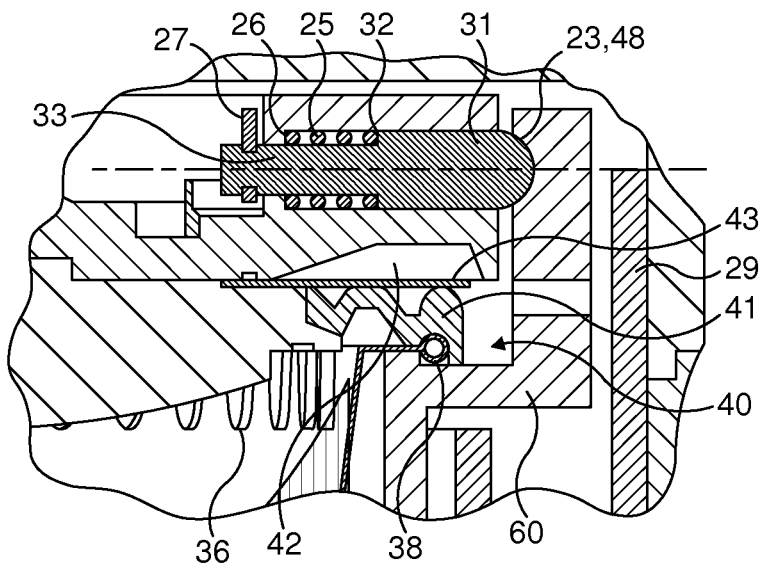
FIG. 3A is a detail of the view of FIG. 3.

As apparent in FIGS. 3 and 3A, a valve means 40 can be further provided such as described in WO2008/148646 to create a flow restriction or venturi between the rim 38 of the capsule 17 and a spring-biased pressing portion 41 of the liquid interfacing part. The portion 41 can be, for instance, a rubber or plastic annular tongue which is mounted in a circumferential recess 42 of the base plate. The tongue is urged in the axial direction "I" by means of a spring-biasing element 43. The element 43 can be any suitable spring such as an elastic blade. The valve means is further stressed by the central spring 11. It should be noted that the pressing portion 41 and spring-biasing element 43 could be formed as an integral element. Therefore, the rim 38 of the capsule forms the fixed part of the valve means and the spring-biased pressing portion 41 forms the mobile part which moves away from the rim under the hydraulic pressure of the centrifuged liquid. However, this could also be the opposite. For example, the rim of the capsule could be formed of a portion that is forced to open under the force of an elastic means placed in or below the rim. In another alternative, the valve means could be entirely integrated in the capsule such as described in WO2008/148601.

The holding part 16 comprises a rim's support portion 60 forming a step of the part and an upper side wall 29 extending upwards from portion 60. The support portion 60 is configured to firmly support at least a portion of the rim 38 of the capsule. Multiple openings 61 are further provided through the side wall 29 at substantially the same level of the valve means in order to ensure that the centrifuged beverage can traverse the lower rotating part 16. These openings could have different shapes such as circular or oblong. They can be also be elongate slots.

In the frame 15 is also provided a collector 44 for receiving the centrifuged beverage leaving the capsule and passing through the valve means 40 and openings 61. The collector comprises a U-shaped annular wall which is located between the lower frame 15 and the holding part 16. On its external side, the wall extends upwardly beyond the level of the openings 61 to form a wall of impact for the centrifuged liquid coming out of the capsule. The collector further extends on an angular portion of the wall by a beverage outlet 46. Such outlet traverses an opening 47 provided into the lower frame 15. Therefore, during the centrifugation, the beverage is collected in the collector 44 and drained through the outlet to fill a receptacle (e.g., a cup) placed beneath the outlet.

According to a general aspect of the invention, the liquid interfacing part 8 and the holding part 16, which are both rotating parts of the device, are connected together by connection means. The connection means of the rotating parts 8, 16 preferably form together a latching means. As will be more particularly discussed hereafter, the latching means comprise at least one latching element forming, being part of or being linked to at least one discrete mass of inertia that is, to some extent, moveable outwardly under the effect of centrifugation and thereby can increase the latching forces of the latch element under such conditions.

Figure 4:
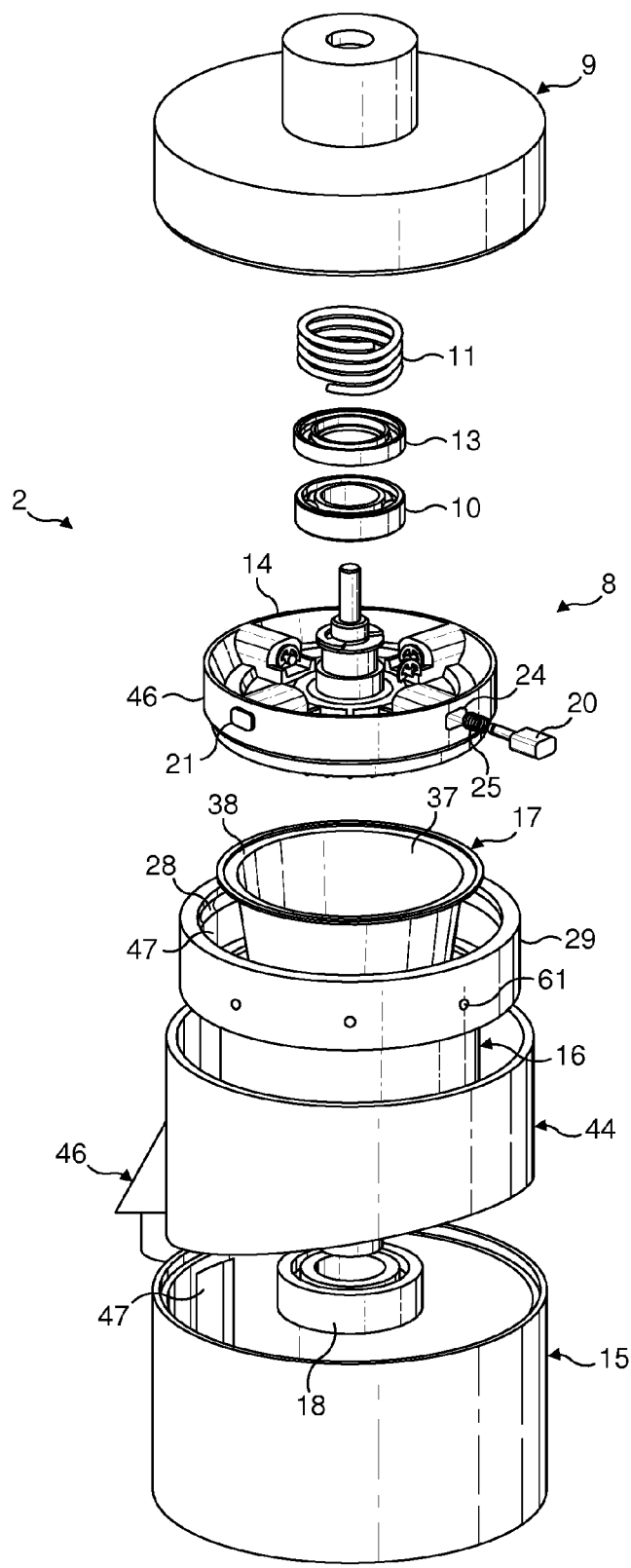
FIG. 4 represents a perspective view of the device of the invention.

In the illustrated mode of the invention, the device comprises a series of latches including pins 20, 21, each one delimiting an engaging surface 23, such as a surface of rounded shape. More precisely, four latches are distributed on the periphery of the parts at 90 degree in the illustrated mode (FIG. 4). The pins are lodged in housings 24 of the part 8, more particularly, located through the periphery wall 46 of the base plate 14. The pins and housings are preferably oriented radially along the part. Furthermore, the pins are distributed at different radial locations of the part in order to provide a secured connection between the two rotating parts. An elastic means 25 is inserted between the pin and a rear abutment surface 26 of the housing such that it becomes elastically biased when it is urged radially inwards during the connection operation. More particularly, the pin has a front larger portion 31, a step 32 and a rear portion 33 of smaller cross-section that penetrates through an opening of the abutment surface 26 and which is engaged by a retaining ring 27. The larger front portion 31 forms a significant mass of inertia for the pin. The elastic means 25, preferably an helical spring is thereby mounted around the rear portion 33 of the pin and abuts, on one side, against the step 32 of the pin and, on its other side, against the abutment surface 26 of the housing. The retaining ring 27 maintains the control of a portion of the pin in the housing.

On the inner side of the holding part 16, the latching means further comprise a peripheral recess such as a groove 28. The groove is complementary shaped and extends circumferentially in the internal tubular surface 47 of the sidewall 49 of the holding part to be engaged by the plurality of pins. The groove is more precisely provided in the internal surface 47 above the level of the receptacle 17 when the receptacle is fitted in place in the holding part. The advantage of a continuous recess 28 is that the liquid interfacing part 8 does not necessarily require a specific orientation during the connecting operation.

FIGS. 3 and 3A show the device when the liquid interfacing part 8 is connected to the holding part 16 by means of the pins which are engaged in the groove 28 of the holding part. A concave retaining surface 48 of the groove is provided that engages with the complementary convex surface 23 of the pin. The curved retaining surface 48 of the groove extends upwardly and inwardly and is engaged in the complementary curved surface 23 of the pin. When the device is placed in the brewing conditions as illustrated in FIG. 3, the capsule 17 is driven in rotation by the two parts 8, 16 closed by the latching means. A dynamic hydraulic pressure is created in the capsule, such pressure increasing progressively from the central axis I towards the periphery as illustrated by the pressure curve 30. This hydraulic pressure reaches a maximum value at the most peripheral point of the capsule. The pressure is exerted on the liquid interfacing part in the axial direction to open the valve means 40 which provides the restricted flow path for the centrifuged beverage. For example, the valve means 40 opens when a pressure threshold is reached upstream of the valve means, for example, of several bars. Opening is carried out by the tongue 41 deflecting upwardly as previously mentioned. Since the curved retaining surface 48 of the groove extends upwardly and inwardly and deforms the leaf spring 43, thereby, forming with the curved surface 23 of the pin, an abutting means acting against the hydraulic disengaging forces applied in the longitudinal axis I. When these axial forces are applied to tend to separate the two parts 8, 16, these surfaces 23, 48 cooperate in engagement to resist such separation.

When the device is at rest, i.e., when it does not rotate around the longitudinal axis I, the sole retaining forces of the latching means in the axial direction are obtained by the forces on the same surfaces 23, 48 but resulting only from the elastic means 25 which maintain the pins in the groove. Such retaining forces are relatively low comparatively to the centrifugal forces. However, at rest of the device, the advantage of lower retaining forces is that the connection and disconnection of the liquid interfacing and holding parts is facilitated.

In order for the valve means to work correctly, the connection obtained by the latching means must resist to the dynamic hydraulic pressure. In particular, the centrifugal forces Fc created by the rotation generates dynamic closing forces Fd oriented axially as resulting from the mass of the pins which is submitted to the centrifugal forces. As a result of these forces and the orientation of the engaging surfaces 23, 48, the closure forces increase considerably compared to the closure forces provided by the sole elastic means in the static conditions of the system. For instance, the force Fd may reach a value close to 800N at the maximum rotational speed of about 10000 rpm. This value decreases to about 50-100N when the rotation is stopped.

The actuation of the connection of the liquid interfacing part with the holding part can be carried out by the closure actuation mechanism 45 acting, for instance, onto the upper frame as shown in FIG. 1. The closure mechanism can be a cam system as represented, or a rotary bayonet-like closure system or a knee-joint means or an hydraulic means or a motorized spindle-type mechanism a combination of these systems. Of course, this closure mechanism can also be associated to the lower frame 15 or to both frames 9, for a relative closure movement between the parts.

Figure 5:
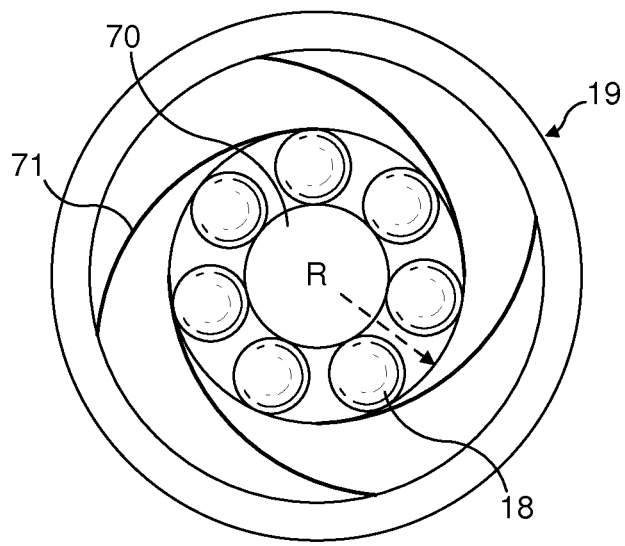
FIG. 5 represents a detail of the device of the present invention along cross section A-A, in particular, a compliant module of the device ensuring the alignment of the different parts of the device.

FIG. 5 illustrates a possible detail of the lower bearing connection of the device for ensuring a self-alignment of the holding part with the liquid interfacing part. In its general principle, the rotational axle 70 of the holding part is spring-biased in the radial direction "R" but stiff in the axial direction "I". In this particular mode, the axle 70 is fixed to the bearing 18 but the bearing 18 is linked to the housing 19 of the lower frame portion by a series of helical leaf springs 71. This self-aligning arrangement also reduces the vibrations during the centrifugation. Of course, the elastic means 71 can be replaced by any equivalent means providing a resilient displacement in the radial direction such as a rubber element, for instance. Also, this self-alignment system can be placed on the upper bearing assembly as well.

Figure 6:
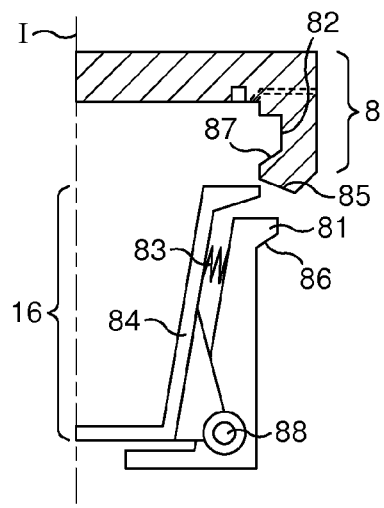
FIGS. 6 to 9 represent a schematic illustration of a variant of the brewing unit showing the different connecting stage of the liquid interfacing and holding part.
Figure 7:
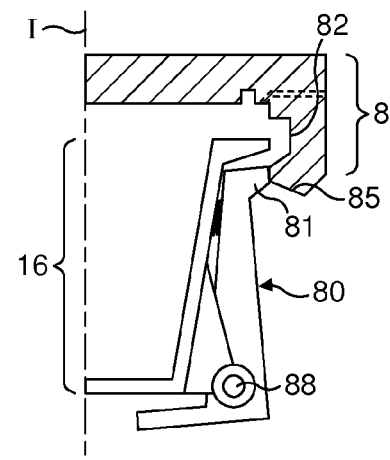

The latching principle of the present invention may take different designs without departing from the scope of the invention. As it is illustrated in the embodiment of FIGS. 6 to 7, a holding part 16 is connected to a liquid interfacing part 8 by means of hook members 80 which are pivotally attached to the holding part. The hook member 80 comprises an engaging head 81. The liquid interfacing part comprises a peripheral portion with a peripheral groove 82 a hook member 80 is urged outwards by means of an elastic biasing member 83. The elastic biasing member 83 can be positioned, for example, between the hook member and the side wall 84 of the holding part. Several hook members can be distributed in different radial locations of the holding part to provide a secured connection of the holding part with the liquid interfacing part. The hook members 80 form individual masses of inertia which is mobile around a pivot 88. For introduction of the hook members 80 in the groove 82 during engagement, the parts 8, 16 are moved relative to one another axially until the head 81 is urged inwards against the elastic biasing member 83 for passing the cam portion 85 and engaging into the groove 82 (FIG. 7). The hook member further comprises an engaging surface 86 which engaged with an engaging surface 87 of the groove 82. The engaging surfaces 86, 87 are slightly inclined relative to the transversal direction in order to provide a component of forces in the axial direction that increases as the centrifugal forces are produced or increase.

Figure 8:
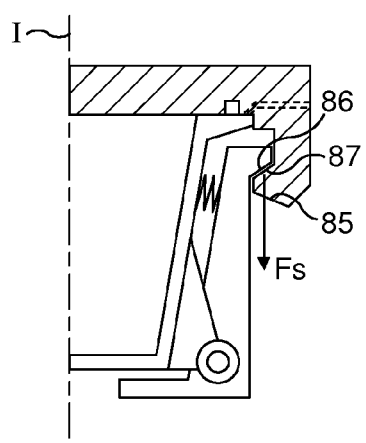
Figure 9:
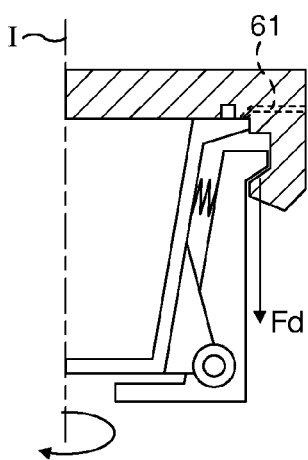

At rest, these connection means provide a moderate closure force of axial component Fs which is determined by the force of the elastic biasing member 83 (FIG. 8). When the two parts 8, 16 of the brewing unit are driven jointly in rotation around the longitudinal axis I, the axial component Fd of the dynamic force increases due to the centrifugal forces acting on the hook member which is mobile by through its pivot arrangement relative to the holding part.

The invention claimed is:

1. A device for preparing a beverage from a beverage ingredient contained in a receptacle by centrifuging the receptacle, the device comprising:
   a holding part configured and arranged for holding the receptacle in a position enabling it to be driven in rotation along a longitudinal axis of rotation, the holding part comprising a support portion forming a step, and an upturned wall extending from the support portion, the support portion configured to support at least a portion of a rim portion of the receptacle, and the upturned wall comprising at least one circumferential groove;
   a liquid interfacing part in communication with a liquid supply line, the liquid interfacing part configured and arranged to engage the receptacle when the receptacle is held in the holding part so that the receptacle is held between the liquid interfacing part and the holding part, the liquid interfacing part comprising (1) an injector configured to inject liquid in a center of the receptacle and (2) an extractor configured to extract the beverage from the receptacle;
   a flow restriction valve comprising a pressing portion engaging with the rim portion of the receptacle; and a collecting part for collecting the beverage obtained by the interaction between the ingredient and water in the receptacle, wherein the collecting part surrounds the holding part, and the holding part comprises radial through-openings positioned substantially at the same level as the flow restriction valve for allowing the beverage to traverse the holding part before being collected on the collecting part, the holding part and liquid interfacing part are connected together by a connection part in such a manner that these parts rotate together with the receptacle during centrifugation, and the connection part comprising (i) a plurality of pins that extend in different radial directions and penetrate, in latching engagement, into the at least one circumferential groove of the holding part during connection in a manner preventing the holding part and the liquid interfacing part from moving away from each other, at least in the axial direction of rotation, and (ii) a spring configured and arranged to urge the pins in engagement in the at least one circumferential groove, the pins provided with at least one degree of freedom in a least one radial direction for enabling engagement forces to increase as a result of the increase of the centrifugal forces wherein the connection part is located above the receptacle.

2. The device according to claim 1, wherein the plurality of pins is moveably linked in sliding or rotational arrangement with one of the liquid interfacing part or holding part.

3. The device according to claim 1, wherein the engaging surfaces of the two parts of the device are such that they extend at least in a direction of the liquid interfacing part and the holding part which is inclined or curved relative to the longitudinal axial direction of rotation.

4. The device according to claim 1, comprising a self-alignment arrangement configured and arranged with one of a holding or liquid interfacing parts, such arrangement comprising a second elastic member between a bearing of the rotating axle of the holding part and a frame.

5. The device according to claim 1, wherein the beverage extractor comprises a series of perforating members for perforating outlet openings in a wall selected from the group consisting of an upper wall of the receptacle, a sidewall of the receptacle, and a combination thereof.

6. The device according to claim 1, wherein the pressing portion of the flow restriction valve engages with the rim portion of the receptacle under a load of the spring, and wherein during centrifugation, the pressing portion is moved away from the rim portion by the pressure of the centrifuged beverage ingredient so as to create at least one flow passage between the pressing portion and the rim portion of the receptacle.

7. The device according to claim 1, wherein the receptacle is a capsule containing a dose of a beverage ingredient comprising a cup-shaped body comprising a bottom, a widening sidewall, a rim portion protruding outwardly and an upper wall covering the body.

8. The device according to claim 1, wherein the beverage ingredient is roast and ground coffee powder.

9. The device according to claim 1, wherein the pins are configured to be provided on a radially outermost periphery of the receptacle.

* * * * *